United States Patent Office 3,499,944
Patented Mar. 10, 1970

3,499,944
HYDROCARBON SEPARATION PROCESS
Alan Goldup, West Byfleet, and Michael Thomas Westaway, Ashford, England, assignors to The British Petroleum Company Limited, London, England, a corporation of England
No Drawing. Filed June 12, 1967, Ser. No. 645,503
Claims priority, application Great Britain, Sept. 8, 1966, 40,186/66
Int. Cl. C07c 7/02
U.S. Cl. 260—666    33 Claims

ABSTRACT OF THE DISCLOSURE

Mixtures of alicyclic or non-cyclic hydrocarbon components having different degrees of branching and/or different numbers of carbon atoms per molecule, but having the same degree of saturation are separated by contacting them in vapour or liquid form with a compound having the basic nuclear structure:

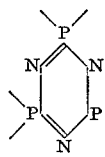

to form a complex with one or more of the components and recovering the mixture depleted in these components and the components from the complex.

This invention relates to a process for the separation of hydrocarbons.

Allcock and Siegel (J.A.C.S., 1964, vol. 86, 5140) discloses that the compound tris-(o-phenylenedioxy) phosphonitrile trimer, (alternatively known as tris-(o-phenylenedioxy) cyclotriphosphazene, and hereinafter referred to as TPNT), forms molecular inclusion compounds with certain organic liquids. The selective sorption of one component of the liquid mixtures, heptane-cyclohexane, hexane-benzene, hexane-cyclohexane, and carbon tetrachloride-benzene, is also mentioned. It will be noted that each of these comprises a cyclic and a non-cyclic component differing in molecular constitution.

We have now found that preferential sorption occurs on phosphonitrilic materials as hereinafter set forth, from the liquid or vapour phase, of one or more hydrocarbon components of a mixture, the preferentially sorbed components having certain structural differences from the other components.

The invention accordingly consists in a hydrocarbon separation process which comprises contacting a vapour or liquid mixture comprising alicyclic or non-cyclic hydrocarbon components having different degrees of branching, as hereinafter defined, and/or different numbers of carbon atoms per molecule, but having the same degree of saturation, with a compound which forms an inclusion complex more readily with one or more of the components than with the other components, and having the basic nuclear structure:

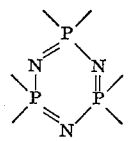

hereinafter referred to as a PNT-type structure, so as to preferably sorb one or more components, and recovering a mixture depleted in said sorbed components.

The preferentially sorbed hydrocarbons may be recovered by desorption from the inclusion complex in a separate operation and the sorbent re-used.

Branching is defined as existing at a given non-terminal carbon atom in a molecule when the given carbon atom has less than 2 hydrogen atoms attached thereto. The degree of branching in the molecule is the extent to which this occurs. Geometrical isomers for the purpose of this specification are defined as having different degrees of branching.

The selectivity of the sorbent for the components of the mixture is as follows:

GEOMETRICAL ISOMERS

The least branched isomer is in general selectively sorbed. The transisomer tends to be sorbed preferentially to the cis isomer.

HYDROCARBONS OF DIFFERENT CARBON NUMBER

The hydrocarbon with the greatest number of carbon atoms per molecule is most readily sorbed in general. In the case of components having an alicyclic group in the respective molecules and unbranched side chains the component with the longest side-chain is preferentially sorbed.

HYDROCARBONS HAVING DIFFERENT DEGREES OF BRANCHING (OTHER THAN GEOMETRICAL ISOMERS)

In general the least or less branched hydrocarbon component is most readily sorbed.

It is to be noted that any hydrocarbon containing an aromatic group, for example, an alkyl-substituted aromatic hydrocarbon, is excluded from the scope of the invention disclosed herein.

The mixture may contain for example, mono-olefins, di-olefins, poly-olefins, n-paraffins, iso-paraffins, or $C_1$–$C_5$ alkyl-substituted alicyclic hydrocarbons, provided that it falls within the terms of the foregoing definition. The components of the mixture preferably contain up to 9 carbon atoms per molecule.

Operation in the vapour phase is preferred.

It is believed that in the presence of hydrocarbon molecules with which the PNT-type structure complexes (guest molecules) the phosphonitrilic material (host material) forms a structure having periodically recurring voids into which the guest molecules may fit.

As an example, in the case of TPNT, it is believed that regular channels of hexagonal cross-section are formed in the presence of the guest molecules. The forces retaining the guest molecules within the channels are weak and thus guest molecules may readily be removed from the complex. On removal of the guest molecules it is believed that the TPNT crystal lattice is disrupted, to reform in the presence of further guest molecules.

Molecular shape is an important factor in determining the extent of sorption, i.e. the ease with which a guest molecule is accommodated within the PNT-type structure. One facet of molecular shape is the cross-section, but this, although important, is not the only criterion of sorption. We have, for example found that TPNT sorbs p-xylene preferentially to ethylbenzene, although these may be regarded as having very similar cross-sections.

The preferred compound of PNT-type structure is TPNT. It has the formula:

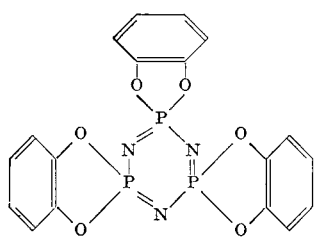

Other PNT-type compounds which may form inclusion complexes of the type described are o-phenylenediamino cyclotriphosphazene and 2,3-naphthyldioxy cyclotriphosphazene.

TPNT itself may be prepared by reacting phosphonitrilic chloride trimer $(PNCl_2)_3$ with catechol. Phosphonitrilic chloride trimer may be prepared, together with other phosphonitrilic derivatives by reaction of ammonium chloride with phosphorus pentachloride. TPNT is a white crystalline solid melting at 244–245° C.

The PNT-type material may be used in its free state or may be pelleted or deposited on an inert support. Suitable supports are for example, ground firebrick, diatomaceous earth, silica gel, alumina, or porous glass. It may be preferable to silanise the support. A particularly suitable, and preferred, supported sorbent comprises PNT-type material incorporated with one or more cured thermosetting resins resistant to hydrocarbons under the conditions of use of the sorbent. Such a supported sorbent is described, inter-alia, in our United States application Ser. No. 688,333, filed Dec. 6, 1967.

The PNT-type material may also be deposited as a thin film on a laminar support, or on a fibrous support. We have found that the PNT-type material may be deposited from solution in an organic solvent by stirring and refluxing with the support material under nitrogen, cooling, filtering, and drying under vacuum. We have deposited TPNT from xylene solution on 80–100 BSS mesh silanised diatomaceous earth in this way. We have also obtained TPNT loadings of from 5 to 30% wt. on 8–12 BSS mesh ground firebrick by saturating it with a 6% w./v. solution in xylene, evaporating off the solvent, and repeating the operation until the required loading was reached.

The support material should be so chosen as to provide, inter-alia, a low pressure drop across the reactor containing the PNT-type material and a high loading of PNT-type material per unit volume of the reactor, but care should be taken that the rate of equilibration of the PNT-type material with the hydrocarbon material is not too low.

The sorbate may be removed from the PNT-type material by displacement with another sorbate or by elution with an inert gas or liquid or by reduction in the ambient pressure, i.e. reduction in the vapour pressure of the sorbed material (the so called "pressure swing" technique). Desorption can also be obtained by increasing the temperature. Which method is chosen will depend on factors of which those skilled in the art will be aware, such as the cost of inert gas elution or the provision of means to reduce the pressure in the pressure swing process, but in the preferred vapour phase process a pressure reduction desorption technique is preferred, and a particularly suitable means of achieving such pressure reduction is by condensation of the desorbed material. A process for production of the necessary vacuum for desorption by direct condensation of the effluent from the sorbent bed in a cyclic process is described in our U.S. Patent No. 3,428,552 issued Feb. 18, 1969.

Processes employing any of the methods of desorption described are desirably operated on a cyclic basis, i.e. one cycle of complex formation and recovery of the complexed material is followed by another. We have found that satisfactory results may be obtained by the use of a fixed bed of sorbent, although this is not essential. The PNT material may complex with up to about 10% by wt. of its weight of hydrocarbon material, and it has been found most economic to operate at or near saturation capacity, removing only a portion of the sorbed molecules in each cycle. The feedstock to the sorbent bed may be diluted or undiluted. In the case of a vapour phase process an inert carrier gas, such as nitrogen, may be used.

A purging stage may optionally be employed between the sorption and desorption steps. This purging stage will use an inert gas or liquid, or purging will take place by pressure reduction, as appropriate, and by this means surface sorbed and non-sorbed material is removed. The purging stage may be omitted, for example, when the volume of the reactor in which desorption occurs is large enough, and the quantity of material removable by purging is small enough, for the relative concentration of such material to be neglected. In the case of the pressure reduction process it is essential that the sorption, purge and desorption pressures should decrease in this order, but it is not necessary that these pressures should be distinct and uniform. Purging and desorption may be conveniently carried out as a continuous process by progressive pressure reduction.

Any suitable combination of sorption, purging and desorption techniques may be used, if desired. One example of such a combined process would be a vapour phase sorption, followed by purging with an inert gas, and finally desorption by pressure reduction. Where a diluted feed is used purging may be carried out by reduction in the feed concentration. The use, in a vapour phase process, of a feed diluted with inert gas enables the pressure at any stage in the process to exceed the vapour pressure of the hydrocarbon components of the feed at the process temperature. If the pressure rises above the hydrocarbon vapour pressure when an undiluted feed is used then liquifaction will occur, which may be undesirable.

It may be desirable, in addition, to employ a number of sorbent beds in succession and to pass the effluent from one bed, enriched in one or more components of the feed to that bed, to a further bed.

Tables 1, 2 and 3 below show the ranges from which the reaction conditions of a liquid phase-inert liquid desorption process, a vapour phase-inert gas desorption process, and a vapour phase-pressure reduction desorption process, respectively, may be chosen. It will be realised that the cycle ranges take into account the use of a diluted or undiluted feed and the use or not of a purge stage.

The following are common to all three types of process.

Ratio bed length to diameter__ From 30:1 to 1:1.
Particle size _____ From 4 to 100 mesh BSS.
Temperature _____ 15° C. up to 20° C. below the decomposition temperature of the PNT-sorbed component complex for all stages.

TABLE 1

Inlet pressure _____ From 10 to 5000 p.s.i.a.
Cycle:
    Sorption _____ From 0.1 to 10 LHSV
    Optional purge ___ From 0.1 to 10 LHSV +inert liquid (up to 50 LHSV).
    Desorption _____ Inert liquid (up to 50 LHSV).
Cycle times:
    Sorption _____ From 10 secs. to 60 minutes.
    Purge _____ From 10 secs. to 60 minutes.
    Desorption _____ From 10 secs. to 5 hours.

TABLE 2

Pressure _____ From 10 to 1000 p.s.i.a.
Cycle:
    Sorption _____ From 0.1 to 10 LHSV +insert gas (up to 1000 GHSV).
    Optional purge ___ Inert gas (up to 1000 GHSV).
    Desorption _____ Inert gas (up to 1000 GHSV).
Cycle times:
    Sorption _____ From 10 secs. to 60 minutes.
    Purge _____ From 10 secs. to 60 minutes.
    Desorption _____ From 10 secs. to 5 hours.

TABLE 3

Cycle:
    Sorption _____ From 0.1 to 10 LHSV +insert gas (up to 1000 GHSV).
Pressure:
    Sorption _____ From 10 to 1000 p.s.i.a.
    Optional purge ___ from 0.1 to 100 p.s.i.a.
    Desorption _____ from 0.01 to 10 p.s.i.a.
Cycle times:
    Sorption _____ from 10 secs. to 60 minutes.
    Purge _____ from 10 secs. to 60 minutes.
    Desorption _____ From 10 secs. to 5 hours.

In Tables 2 and 3 the feed space velocity is calculated as the liquid, although the feed is in the vapour phase. The actual values chosen from the above ranges will depend, among other factors, on the nature of the feed to the process, the purity of the product(s) and the nature of the PNT material used, for example, its decomposition temperature, whether it is supported or not, and the nature of the support.

The following are the preferred ranges of conditions for a vapour phase process, using TPNT for the separation of components of a mixture of hexenes differing in degree of branching. Table 4 shows the conditions for an inert gas desorption process and Table 5 gives those for a pressure reduction desorption process. The ranges of ratio of bed length to diameter, particle size, temperature, and cycle times shown in Table 4 are also applicable to Table 5.

TABLE 4

Ratio bed length to diameter _____ From 20:1 to 4:1.
Particle size _____ From 4 to 100 BSS mesh.
Temperature _____ From 60 to 220° C.
Pressure _____ From 10 to 500 p.s.i.a.
Cycle:
    Sorption _____ from 0.2 to 5 LHSV +inert gas (up to 500 GHSV).
    Optional purge ____ Inert gas (up to 500 GHSV).
    Desorption _____ Inert gas (up to 500 GHSV).
Cycle times:
    Sorption _____ From 30 secs. to 15 minutes.
    Purge _____ From 10 secs. to 15 minutes.
    Desorption _____ From 10 secs. to 150 minutes.

TABLE 5

Pressure:
    Sorption _____ From 10 to 500 p.s.i.a.
    Optional purge ____ From 0.1 to 20 p.s.i.a.
    Desorption _____ From 0.01 to 5 p.s.i.a.
Cycle:
    Sorption _____ From 0.2 to 5 LHSV +inert gas (up to 500 GHSV).

If an undiluted feed is used the upper limit of pressure in both Tables 4 and 5 is about 150 p.s.i.g., since this is the vapour pressure of the feed at the decomposition temperature of TPNT. The upper limits of pressure shown are applicable when a diluted feed is used.

In a cyclic process using a number of fixed beds the cycle times for sorption, purge and desorption should be in simple ratios to each other to facilitate switching.

The invention is illustrated by the following examples.

EXAMPLE 1

An olefinic material was obtained as the 56–58° C. cut of the product from a propylene dimerisation reaction using an alkali metal catalyst. The composition of the cut was as follows, percentages being by weight:

| | |
|---|---|
| 4-methylpentene-1 | 33.1 |
| Cis-4-methylpentene-2 | 4.2 |
| Trans-4-methylpentene-2 | 27.6 |
| 2-methylpentene-1 | 0.2 |
| Hexene-1 | 25.6 |
| Hexene-3 (cis+trans) | 0.1 |
| Trans-hexene-2/2-methylpentene-2 | 5.4 |
| n-Hexane/3-methylpentene-2 | Trace |
| Cis-hexene-2 | 2.8 |
| 3-methylpentene-2 | 0.1 |
| 2,3-dimethylbutene-2 | 0.6 |
| Unknown constituents | 0.3 |

Those constituents shown as mixtures were inseparable by gas-liquid chromatography.

The material was passed over 90 grms. of 17.4 wt. percent TPNT on 8–12 BSS mesh ground firebrick in a 210 ml. reactor in the vapour phase. The weight of TPNT was 15.7 grms. The reactor conditions were as follows, a gas displacement technique being used.

Temperature _____ 96° C.
Cycle:
    Sorption _____ 0.5 LHSV+7 GHSV nitrogen.
    Purge _____ 190 GHSV nitrogen.
    Desorption _____ 190 GHSV nitrogen.
Cycle times:
    Sorption _____ 1 minute.
    Purge _____ 1 minute.
    Desorption _____ 2 minutes.
Yield desorbate (UTC/hr.) _ approx. .6%.

| Desorbate composition | Percent wt. |
|---|---|
| 4-methylpentene-1 | 14.0 |
| Cis-4-methylpentene-2 | 0.5 |
| Trans-4-methylpentene-2 | 10.5 |
| Hexene-1 | 60.0 |
| Hexene-2/2-methylpentene-2 | 11.0 |
| Cis-hexene-2 | 4.0 |

A selectivity study was carried out on an identical material to that used in the foregoing reactor study as follows:

50 mgms. of sublimed TPNT were contacted with 0.5 mls. of liquid material. After 2 hours the solid TPNT-sorbed component complex was filtered off and dried in the atmosphere overnight. A sample of the solid was placed in a small heater coil situated in a gas stream on the inlet side of a gas-liquid chromatograph column. By applying a small current to the coil the complex was decomposed and the included material swept on to the column and analysed.

The results obtained were as follows, analysis being by gas-liquid chromatography

| | Percent wt. |
|---|---|
| 4-methylpentene-1 | 7 |
| Cis-4-methylpentene-2 | 1 |
| Trans-4-methylpentene-2 | 6 |
| Hexene-1 | 61 |
| Trans-hexene-2/2-methylpentene-2 | 20 |
| Cis-hexene-2 | 5 |

It will be seen that in both the reactor study and the selectivity study the straight chain hydrocarbon, i.e. hexene-1, was preferentially sorbed. Comparison of the reactor study with the selectivity study shows that in the former case the 4-methylpentene-1 and trans-hexene-2/2-methylpentene-2 components are present in smaller concentration than in the later case. This is because components were desorbed in the reactor study, whereas in the selectivity study the whole complex was decomposed.

EXAMPLE 2

A synthetic blend of equal volumes of iso-octane and n-heptane was passed over an identical sorbent material to that of Example 1 in a 210 ml. reactor. The reactor conditions were as follows, a gas displacement technique being used.

Temperature _____ 125° C.
Cycle:
    Sorption _____ 0.5 LHSV+7 GHSV nitrogen.
    Purge _____ 190 GHSV nitrogen.
    Desorption _____ 190 GHSV nitrogen.
Cycle times:
    Sorption _____ 1 minute.
    Purge _____ 1¼ minutes.
    Desorption _____ 3 minutes.
Yield desorbate (UTC/hr.) _ 5.1%.

Desorbate composition: Percent wt.
    n-Heptane _____ 93
    Iso-octane _____ 7

A selectivity study of an identical blend was carried out using the same conditions as in the selectivity study of Example 1. The desorbate contained 95% wt. n-heptane and 5% wt. iso-octane.

EXAMPLE 3

The following selectivity studies were carried out under the same conditions as in Example 1. All mixtures were equivolume blends, and the desorbate compositions are percentages by weight.

(1)
n-Pentane _____ 1
n-Hexane _____ 9
n-Heptane _____ 90

(2)
Cis-hexene-2 _____ 2.3
Cis-heptene-2 _____ 97.7

(3)
3-methyl-1,2-butadiene _____ 8
2,3-pentadiene _____ 92

(4)
Methylcyclohexane _____ 14
Ethylcyclohexane _____ 86

(5)
Cis-hexene-2 _____ 22
Trans-hexene-2 _____ 78

(6)
2,2-dimethylpentane _____ 3.0
2,4-dimethylpentane _____ 2.0
2,2,3-trimethylbutane _____ 1.0
3,3-dimethylpentane _____ 1.0
2-methylhexane _____ 10.0
2,3-dimethylpentane _____ 1.0
3-methylhexane _____ 3.0
3-ethylpentane _____ —
n-Heptane _____ 77.0

(7)
3-methylpentene-1 _____ 12.9
Trans-3-methylpentene-2 _____ 82.1

(8)
2-methylpentene-1 _____ 29.2
Cis-hexene-2 _____ 70.8

We claim:
1. A method of separating aliphatic hydrocarbon isomers having the same number of carbon atoms and degree of saturation but different degrees of branching comprising contacting a vapour or liquid mixture containing said isomers with a phosphonitrilic compound which forms an inclusion complex more readily with a less branched isomer than with the other components, and having the basic nuclear structure:

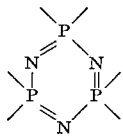

so as to preferentially sorb the less branched isomer and recovering a mixture depleted in said less branched isomer.

2. A method as in claim 1, wherein the aliphatic hydrocarbon isomers comprise non-cyclic paraffins having up to 9 carbon atoms per molecule.

3. A method as in claim 1, wherein said aliphatic hydrocarbon isomers comprise aliphatic dienes.

4. A method as in claim 1, wherein the said aliphatic hydrocarbon isomers comprise olefins.

5. A method as in claim 1, wherein the phosphonitrilic compound is tris (O-phenylenedioxy) cyclotriphosphazene.

6. A process as claimed in claim 1, in which the sorbed material is removed from the said phosphonitrilic compound by displacement with another sorbate.

7. A process as claimed in claim 6, carried out in the vapour phase, in which desorption is effected by reduction in the ambient pressure, such reduction being obtained by condensation of the desorbed material.

8. A process as claimed in claim 1 operated on a cyclic basis at or near the saturation capacity of the said phosphonitrilic compound, only a proportion of the sorbed molecules being removed in each cycle.

9. A process as claimed in claim 1, in which the feed to the sorbent bed is diluted with an inert gas in the case of a vapour mixture and an inert liquid in the case of a liquid mixture.

10. A process as claimed in claim 6, in which a purging stage is interposed between the sorption and desorption steps, purging being carried out by the same means as that used for desorption.

11. A process as claimed in claim 10, in which purging and desorption are achieved successively by reduction in the ambient pressure, it being provided that the ambient pressure decreases in the order; sorption, purge, desorption.

12. A process as claimed in claim 10, in which purging and desorption are achieved by elution with an inert gas or liquid.

13. A method as in claim 5, wherein the aliphatic hydrocarbon isomers comprise non-cyclic paraffins having up to 9 carbon atoms per molecule.

14. A method as in claim 5, wherein the said aliphatic hydrocarbon isomers comprise aliphatic dienes.

15. A method as in claim 5, wherein the said aliphatic hydrocarbon isomers comprise olefins.

16. A method of separating cis from trans aliphatic isomers, each having the same number of carbon atoms in the molecule, comprising contacting a vapour or liquid mixture containing said isomers with a phosphonitrilic compound which forms an inclusion complex more readily with the cis isomer than with the trans isomer and having the basic nuclear structure:

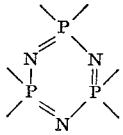

so as to preferentially sorb the cis isomer and recovering a mixture depleted in said cis isomer.

17. A method as in claim 16, wherein the phosphonitrilic compound is tris (O-phenylenedioxy) cyclotriphosphazene.

18. A process as claimed in claim 17, in which the preferentially sorbed hydrocarbons are recovered from the said phosphonitrilic compound in a separate operation.

19. A method of separating at least two non-cyclic aliphatic hydrocarbon components having different numbers of carbon atoms per molecule, comprising contacting a vapour or liquid mixture containing said components with a phosphonitrilic compound which forms an inclusion complex more readily with a component having a greater number of carbon atoms per molecule than with the other component and having the basic nuclear structure:

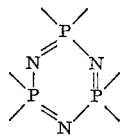

so as to preferentially sorb an aliphatic hydrocarbon of greater carbon number and recovering a mixture depleted in said component of greater carbon number.

20. A process as in claim 19, in which the non-cyclic aliphatic hydrocarbons are olefins.

21. A process as in claim 19, wherein the phosphonitrilic compound is tris (O-phenylenedioxy) cyclotriphosphazene.

22. A process as in claim 21, wherein the non-cyclic aliphatic hydrocarbons are olefins.

23. A process of separating at least two alicyclic aliphatic hydrocarbon components having different numbers of carbon atoms per molecule, comprising contacting a vapour or liquid mixture containing said components with a phosphonitrilic compound which forms an inclusion complex more readily with a component having greater number of carbon atoms per molecule than with the other component and having the basic nuclear structure:

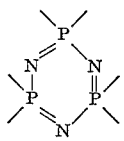

so as to preferentially sorb an aliphatic hydrocarbon of greater carbon number and recovering a mixture depleted in said component of greater carbon number.

24. A process as in claim 23, wherein the phosphonitrilic compound is tris (O-phenylenedioxy) cyclotriphosphazene.

25. A process as in claim 23, wherein said alicyclic compounds have both alicyclic groups and non-cyclic aliphatic groups in the same molecule.

26. A process as in claim 5, wherein the process is carried out in accordance with the following conditions:
(a) the particle size of the phosphonitrilic compound is about 4 to 100 mesh BSS; and
(b) the temperature at which said process takes place is about 15° to 20° C. below the decomposition temperature of the phosphonitrilic compound.

27. A process as in claim 26, in which the following additional process steps and conditions are followed:
(a) the pressure under which said process takes place is about 10 to 5,000 p.s.i.a.;
(b) the hydrocarbons are sorbed at about 0.1 to 50 LHSV, purged at about 0.1 to 50 LHSV, and desorbed at about 0.1 to 50 LHSV; and
(c) the hydrocarbons are sorbed for about 10 to 60 minutes, purged for about 10 seconds to 60 minutes, and desorbed for about 10 seconds to 5 hours.

28. A process as in claim 26, in which the following additional process steps and conditions are followed:
(a) the pressure under which said process takes place is about 10 to 1,000 p.s.i.a.;
(b) the hydrocarbons are sorbed at about 0.1 to 1,000 GHSV, purged at about 0.1 to 1,000 GHSV, and desorbed at about 0.1 to 1,000 GHSV; and
(c) the hydrocarbons are sorbed for about 10 seconds to 60 minutes, purged for about 10 seconds to 60 minutes, and desorbed for about 10 seconds to 5 hours.

29. A process as in claim 26, in which the following additional process steps and conditions are followed:
(a) the hydrocarbons are sorbed at about 0.1 to 10 LHSV;
(b) the hydrocarbons are sorbed under a pressure of about 10 to 1,000 p.s.i.a., purged under a pressure of about 0.1 to 100 p.s.i.a., and desorbed under a pressure of about 0.01 to 10 p.s.i.a.; and
(c) the hydrocarbons are sorbed for about 10 seconds to 60 minutes, purged for about 10 seconds to 60 minutes, and desorbed for about 10 seconds to 5 hours.

30. A process as in claim 23, in which the sorbed component is removed from the said phosphonitrilic compound by elution with an inert gas.

31. A process as in claim 23, in which the sorbed component is removed from the said phosphonitrilic compound by elution with an inert liquid.

32. A process as in claim 23, in which the sorbed component is removed from the said phosphonitrilic compound by reduction in the ambient pressure.

33. A process as in claim 23, in which the sorbed component is removed from the said phosphonitrilic compound by an increase in the ambient temperature.

References Cited

UNITED STATES PATENTS

| | | |
|---|---|---|
| 3,030,431 | 4/1962 | Mattox. |
| 3,037,338 | 6/1962 | Thomas. |
| 3,053,913 | 9/1962 | Norris. |
| 3,061,654 | 10/1962 | Gensheimer. |
| 3,121,756 | 2/1964 | Barrer. |
| 3,184,406 | 5/1965 | Yeo. |

OTHER REFERENCES

H. R. Allcock et al., J. Amer. Chem. Soc., vol. 86, p. 5140, 1964.

DELBERT E. GANTZ, Primary Examiner

V. O'KEEFE, Assistant Examiner

U.S. Cl. X.R.

260—676, 677, 681.5